UNITED STATES PATENT OFFICE.

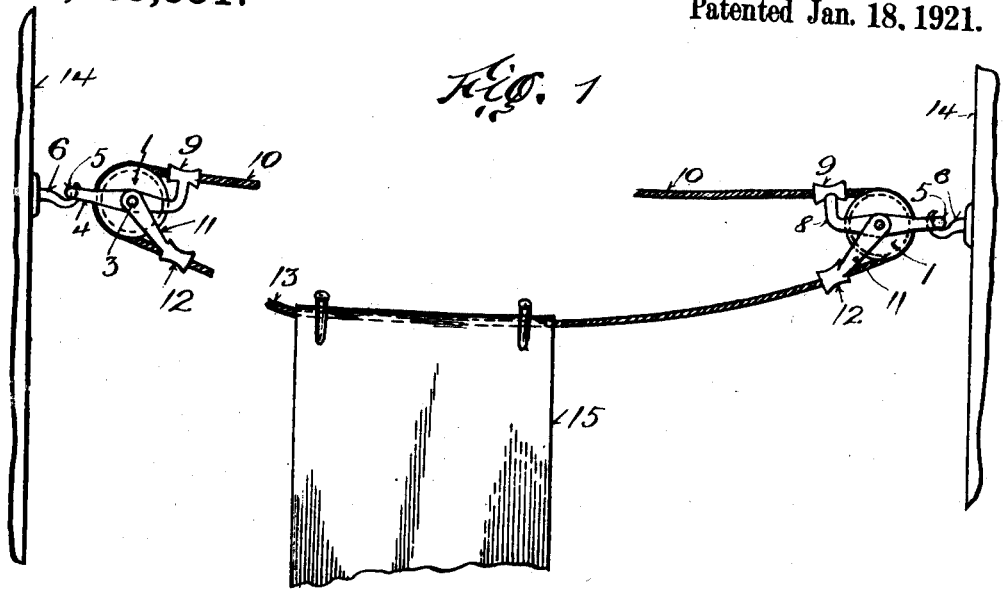
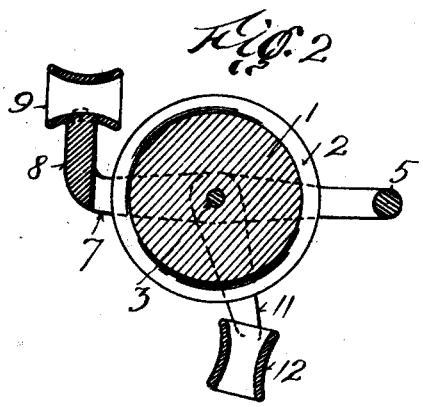
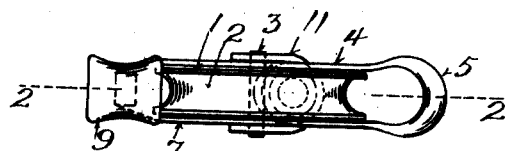

ALPHONSE RAPP, OF BROOKLYN, NEW YORK.

PULLEY.

1,365,951. Specification of Letters Patent. Patented Jan. 18, 1921.

Application filed May 17, 1920. Serial No. 381,794.

*To all whom it may concern:*

Be it known that I, ALPHONSE RAPP, a citizen of the United States, and a resident of the borough of Brooklyn, city and State of New York, have invented certain new and useful Improvements in Pulleys, of which the following is a specification.

My invention relates to pulleys and though there are various uses for the article it is especially advantageous when used as a pulley for clothes lines. The object of my invention is to provide a pulley having guides to prevent the line or rope from disengaging from the groove of the pulley. The guide for the upper run of the line is made stationary in relation to the pulley frame or yoke whereas the guide for the lower run of the line or rope is mounted to pivot around the axis of the pulley in order to automatically adjust itself to the varying angle of the lower run of the line or rope, in order to avoid binding and to reduce the wear on the line or rope. The present device is simple and inexpensive as well as being handy to operate.

In the drawing forming part of this application,

Figure 1 is an elevation of a clothes line engaging over a pair of pulleys which embody my invention, Fig. 2 is a sectional view of the pulley, taken on the line 2—2 of Fig. 3, and Fig. 3 is a plan view of my device.

The pulley wheel consists of a wheel 1 having the usual circumferential groove 2 in which the rope or line engages. The pulley revolves freely on an axle 3 which is mounted in a frame or yoke 4. The latter passes around the pulley wheel and is projected to form an eye 5 for engagement over a hook 6 from which the pulley device is supported. Forks 7 project forwardly from the yoke and they turn upwardly at 8 and are provided with a guide socket 9 through which the upper run 10 of the line passes. This guide member 9 is fixed in relation to the frame 4 and the pulley 1 because the upper run 10 of the line is approximately straight when the lower run is supporting the load and because there would be a binding action if the two guides were not relatively movable.

There is a yoke 11 having its arms pivoted on the shaft 3 and on the outer portion of this yoke there is a second guide member 12 through which the lower run 13 of the line passes.

Generally, a pair of pulley devices will be arranged on spaced supporting means 14 and the line will be threaded through them and tied as shown in Fig. 1. The articles to be hung on the line will be attached to the lower run thereof as shown at 15 in Fig. 1 and when this is done the lower run 13 will sag so that the angle which it bears to the pulley wheels varies. This angle also varies as the operator moves the line to shift the line and the garments it supports. As the angle of this lower run varies, the line leads from the periphery of the pulley at different positions and the yoke 11 turns easily on the shaft 3 so that the guide 12 adjusts itself automatically to the requirements of the line. While the guide 12 prevents the line jumping sidewise out of the pulley groove 2 there is no binding of the line on the guide. When the garments are hung on the lower run of the line the upper run is simply drawn tighter by the weight but the angle of the upper run of the line does not vary substantially and the guide 9 is fixed relatively to the frame, and it serves its purpose better when so fixed.

Having described my invention what I claim is:

A pulley device of the character described, comprising a frame, a grooved, revoluble pulley wheel mounted thereon, a fixed guide for the upper run of the line mounted on said frame and adapted to retain the upper run of the line in the groove of said pulley, a yoke pivoted to said frame to swing about the axis of said pulley wheel and a guide on said yoke for guiding the lower run of said line, said latter guide being freely movable with said line concentrically of the pulley wheel for the purpose set forth.

Signed at the city, county and State of New York, this 22nd day of April, 1920.

ALPHONSE RAPP.